United States Patent [19]

Bahnick et al.

[11] Patent Number: 4,872,004

[45] Date of Patent: Oct. 3, 1989

[54] PLURAL SOURCE ARBITRATION SYSTEM

[75] Inventors: Karl R. Bahnick, Vernon Hills; David E. Groe, Oakwood Hills, both of Ill.

[73] Assignee: Sun Electric Corporation, Crystal Lake, Ill.

[21] Appl. No.: 189,231

[22] Filed: May 2, 1988

[51] Int. Cl.⁴ .............................................. H04Q 1/00
[52] U.S. Cl. ..................... 340/825.500; 340/825.510; 370/85.2; 364/200
[58] Field of Search ..................... 340/825.06, 825.07, 340/825.5, 825.51, 825.52; 364/200 MS File, 900 MS File; 370/85, 110.1

[56] References Cited

U.S. PATENT DOCUMENTS

| | | | |
|---|---|---|---|
| 3,492,648 | 1/1970 | Olsen et al. | 340/825.51 |
| 4,423,384 | 12/1983 | DeBock | 340/825.51 |
| 4,479,122 | 10/1984 | Redman et al. | 340/825.5 |
| 4,608,562 | 8/1986 | Minor et al. | 340/825.52 |
| 4,612,542 | 8/1986 | Pantry et al. | 340/825.5 |
| 4,630,041 | 12/1986 | Casamatt et al. | 340/825.5 |
| 4,787,033 | 11/1988 | Bomba et al. | 340/825.5 |
| 4,818,985 | 4/1989 | Ikeda | 340/825.51 |

*Primary Examiner*—Donald J. Yusko
*Assistant Examiner*—E. O. Pudpud
*Attorney, Agent, or Firm*—Nicholas A. Camasto

[57] ABSTRACT

The plural source arbitration system relates generally to communications systems for linking peripheral devices to a computer. Specifically, the arbitration system allows an external keyboard and a remote control device to be intercoupled to the keyboard slot of a computer and carry out communications without confusion.

5 Claims, 4 Drawing Sheets

PLURAL SOURCE ARBITRATION SYSTEM

BACKGROUND OF THE INVENTION AND PRIOR ART

This invention relates generally to communications systems for linking peripheral devices to a computer and particularly to apparatus for linking two separate devices to a keyboard input of a computer.

The recently introduced Sun MCA 3000 Modular Computer Analyzer for diagnostic testing of automotive engines and the like is centered about an IBM compatible PC. The MCA 3000 Analyzer incorporates a keyboard by which a user-technician may input commands to the diagnostic analyzer. A remote control device is also provided to enable control of the analyzer by the input of commands from a remote location, for example at the site of the engine under test. The present invention is directed to an arbitrator arrangement that permits both a keyboard and a remote control unit to supply signals, via the single keyboard input of the computer, without confusion. The invention utilizes an electrically programmable array logic device (EPAL) that in operation recognizes signal transmissions from any of the three sources (keyboard, remote control and computer) and in the event of a conflict therebetween, couples the signals based upon an assigned priority. This assures that no erroneous data is received by any of the devices and, as will be seen, is accomplished without the need for additional software.

OBJECTS OF THE INVENTION

A principal object of the invention is to provide a novel peripheral communications system for a computer.

Another object of the invention is to provide a communications system whereby multiple sources may communicate, via a single input, with a computer.

A further object of the invention is to provide a novel communications system interconnecting a computer, a keyboard and a remote control device.

BRIEF DESCRIPTION OF THE DRAWINGS

These and other objects and advantages of the invention will become apparent upon reading the following description in conjunction with the drawings in which.

DESCRIPTION OF THE PREFERRED EMBODIMENT

Figure 1:
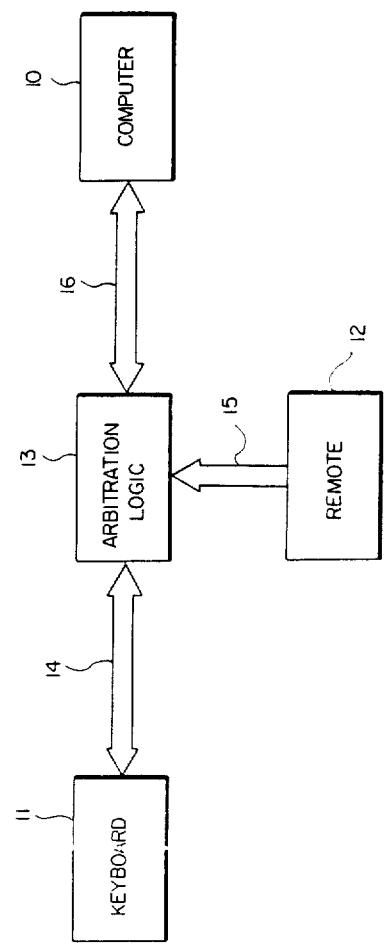
FIG. 1 is a simplified block diagram of the communications system of the invention.

Referring to FIG. 1, a computer 10, which is preferably an IBM compatible computer, is supplied with signal inputs from a keyboard 11 and a remote control device 12. An arbitration logic circuit 13 intercouples computer 10, keyboard 11 and remote device 12. Specifically, a bidirectional communications bus 14 links keyboard 11 with arbitration logic 13, a unidirectional communications bus 15 links remote control unit 12 with arbitration logic 13 and a bidirectional communications bus 16 links computer 10 with arbitration logic 13. As will be discussed below, arbitration logic 13 functions to recognize when a communication occurs and to assure coupling of the data to the correct device and to obviate confusing or erroneous communications. In the event of two or more simultaneous communications, arbitration logic 13 routes the data among the three devices based upon an established priority. This is all accomplished with hard wired logic circuitry.

Figure 2:
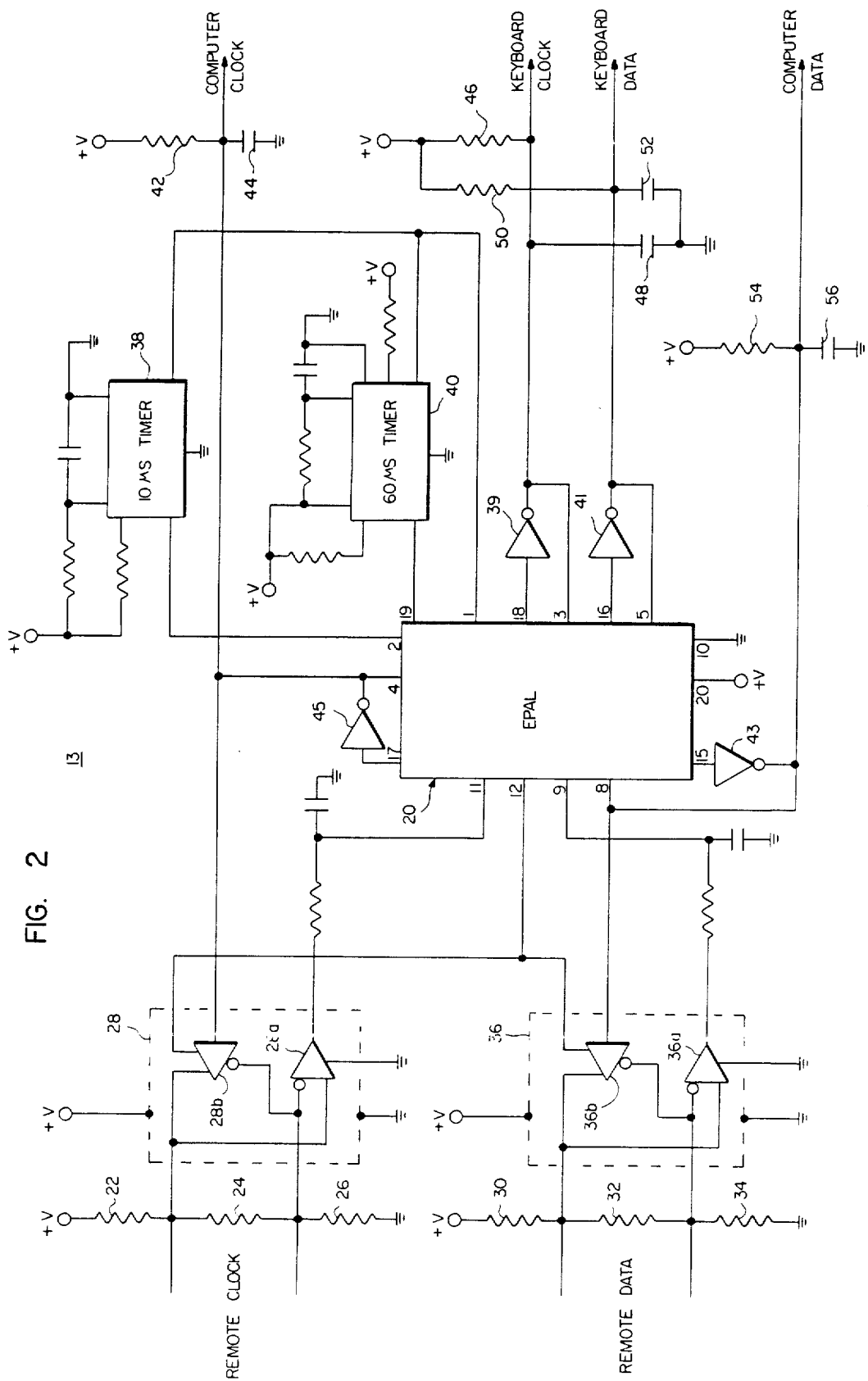
FIG. 2 is a partial schematic diagram of the arbitration logic of FIG. 1.

In FIG. 2 arbitration logic 13 is shown in full schematic detail. The heart of the system comprises an EPAL chip circuit 20. EPAL 20 is a device available under the designation ALTERA EP310 and is illustrated with numbers that correspond to the pin numbers of the device. A pair of differential buffers 28 and 36 are provided for the receipt and transmission of data and clock signals from the remote control device 12. A first voltage divider, comprising three resistors 22, 24 and 26 serially connected between +V and ground, is connected to the remote control unit clock lines (not shown). Differential buffer 28 is connected across resistor 24 of the voltage divider and includes a receiver amplifier 28a and an output driver 28b interconnected as shown for supplying clock signals from remote control device 12 to pin 11 of EPAL 20 and for supplying clock signals to remote control device 12 via output driver 28b. Similarly a second voltage divider, comprising three resistors 30, 32 and 34 serially connected between +V and ground, couples data signals to and from remote control device 12. A differential buffer 36 is connected across resistor 32 in the voltage divider and includes a receiver amplifier 36a and an output driver 36b interconnected as shown. Receiver amplifier 36a supplies a signal from remote control device 12 to pin 9 of EPAL 20.

A 10 microsecond timer 38 is connected across pin 1 and pin 2 of EPAL 20. A 60 microsecond timer 40 is connected across pin 1 and pin 19 of EPAL 20. Both timers 38 and 40 are of the "one-shot" variety, and as will be discussed, timer 38 is started in response to timer 40 being activated and timing out for its 60 microsecond period.

A plurality of resistance-capacitance networks are coupled between +V and ground and serve to bias and filter the computer and keyboard clock and data lines that are connected to the computer 10 and keyboard 11, respectively, at +V potential. Thus, resistor 42 and capacitor 44 provide a junction at a voltage of +V for the computer clock line. Similarly resistor 46 and capacitor 48 serve the keyboard clock line, resistor 50 and capacitor 52 the keyboard data line, and resistor 54 and capacitor 56 the computer data line. The computer clock line is connected to pin 4 of EPAL 20 and to output driver 28b and the computer data line is connected to pin 8 of EPAL 20 and to output driver 36b. The keyboard clock line is connected to pin 3 of EPAL 20 and the keyboard data line is connected to pin 5 of EPAL 20.

A plurality of open collector type inverters 39, 41, 43 and 45 are connected as shown between various pairs of pins of EPAL 20. Specifically, the inverter 39 is connected between pins 3 and 18; inverter 41 between pins 5 and 16; inverter 43 between pins 8 and 15; and inverter 45 between pins 4 and 17.

Figure 3:
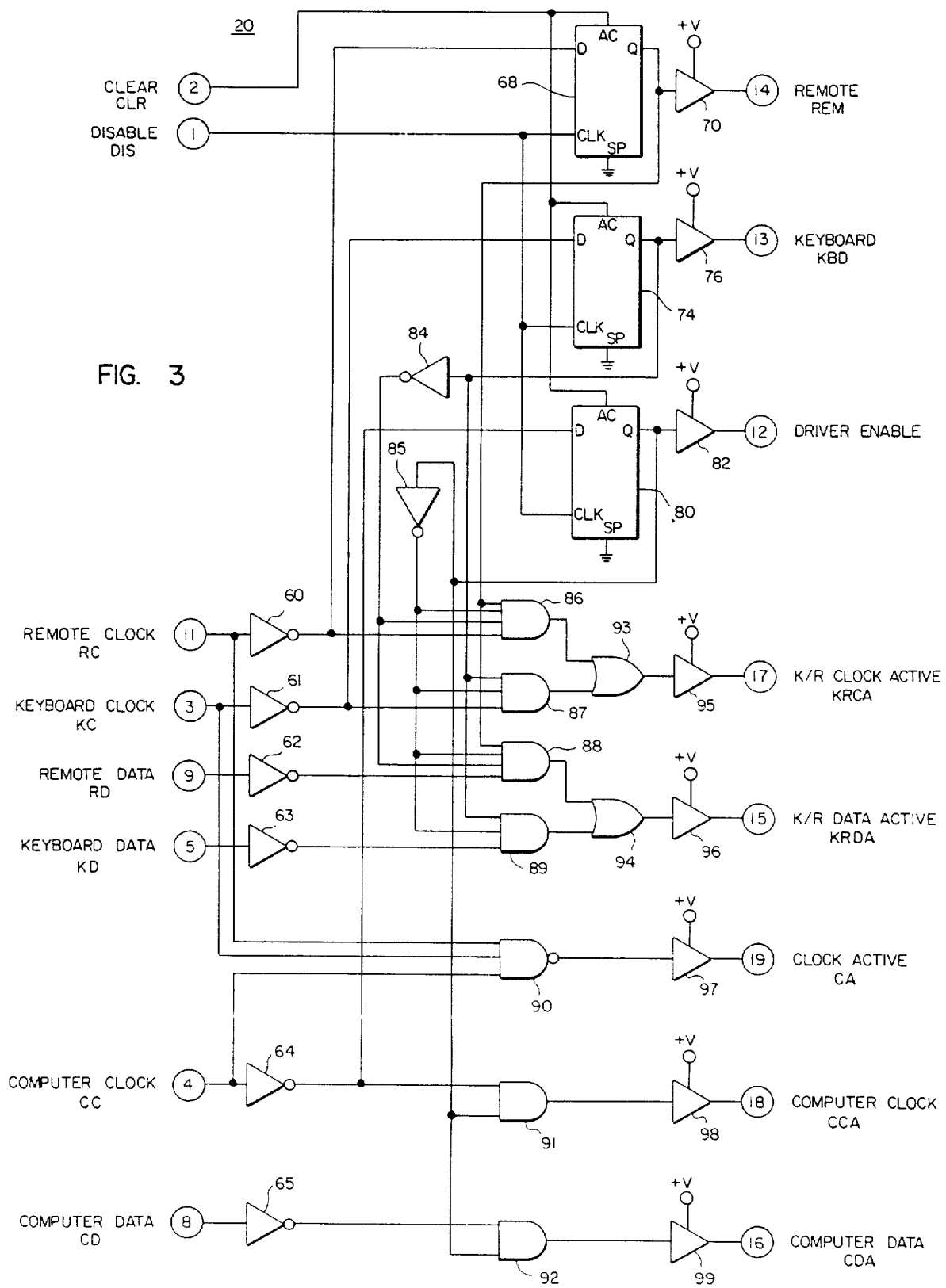
FIG. 3 is a schematic diagram of the EPAL circuit of FIG. 2.

In FIG. 3 the encircled numbers identify the pins of EPAL 20. A plurality of inverters 60, 61, 62, 63, 64 and 65 connect the three clock and three data lines to a corresponding plurality of AND gates 86, 87, 88, 89, 91 and 92 respectively. The three clock lines at EPAL pins 11, 3 and 4 are also connected to a NAND gate 90, the output of which is supplied to a buffer 97 which is connected to pin 19 of EPAL 20. This pin is labelled Clock Active and develops a high logic level voltage whenever any of the three clock lines goes low, i.e. becomes active. Inverters 60, 61 and 64, to which the three clock lines are connected, are also connected to the D input terminals of three flip flop latches 68, 74 and 80, respectively. The clock input terminals of these flip flops are connected to pin 1 of EPAL 20 and their Q output terminals are connected to respective ones of a group of buffers 70, 76 and 82. The Q output terminal of flip flop 68 is connected to the inputs of ANDs 86 and 88, the Q output terminal of flip flop 74 is connected to ANDs 87 and 89 and the Q output terminal flip flop 80 is connected to ANDs 91 and 92. The outputs of ANDs 91 and 92 are supplied to a pair of buffers 98 and 99 which are connected to pins 18 and 16, respectively of EPAL 20. These pins are labelled Computer Clock Active and Computer Data Active, respectively. An inverter 84 connects the Q output terminal of flip flop 74 to ANDs 86 and 88. An inverter 85 connects the Q output terminal of flip flop 80 to ANDs 86, 87, 88 and 89. The outputs of ANDs 86 and 87 are connected to an OR gate 93, the output of which supplies a buffer 95 that is connected to pin 17 of EPAL 20. A high logic level voltage on pin 17 signifies that either the keyboard or remote clock line is active, i.e. has a clock signal thereon. This pin is labelled K/R Clock Active. The output of ANDs 88 and 89 are similarly coupled to an OR gate 94, the output of which is supplied to a buffer 96 that is connected to pin 15 of EPAL 20. Pin 15 is labelled K/R Data Active.

The outputs of buffers 70 and 76 are connected to pins 14 and 13, labelled Remote and Keyboard respectively and, as will be explained, are not used in this implementation of the invention. The output of buffer 82 is connected to pin 12 of EPAL 20 which is labelled Drive Enable. When the logic voltage at pin 12 goes high, it enables the remote clock and data output drivers 28b and 36b (see FIG. 2).

Figure 4:
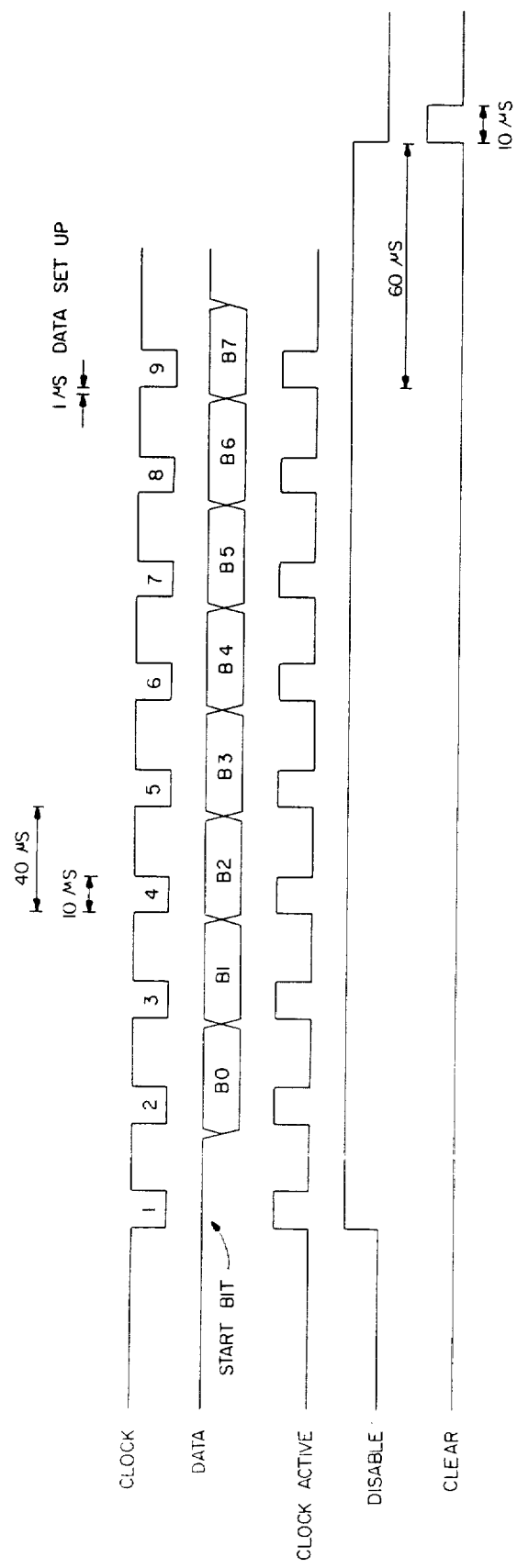
FIG. 4 illustrates the timing between the various signals and the arrangements of the invention.

In FIG. 4, the signals and timing diagrams used in the arbitration system of the invention are shown. The clock signals are seen to be a plurality of negative pulses of 10 microsecond duration spaced 40 microseconds apart. Both the remote control device 12 and the keyboard 11 include crystal controlled clocks and the means for generating clock signals. These clock signals, as well as those generated by the computer 10, all have a 10 microsecond duration and a 40 microsecond spacing—although it is not critical that they be identical. A data signal consists of a start bit, indicated by the data line being high, and a series of eight data bits B0 -B7. The Clock Active signal is developed at pin 19 of EPAL 20 and consists of positive going pulses in time synchronization with the clock pulses. A Disable signal developed by timer 40 and applied to pin 1 of EPAL 20 consists of a positive pulse that extends for the duration of the Clock Active signal and for 60 microseconds from the beginning of the last Clock Active pulse. The Disable signal is also appled to 10 microsecond timer 38, which develops the Clear signal. The Clear signal is applied to pin 10 of EPAL 20 and consists of a 10 microsecond positive going pulse that commences at the termination of the Disable signal. The Disable signal prevents other clock pulses from clocking new data into the flip flops 68, 74 and 80. The Clear signal clears these flip flops. As mentioned, the start bit represents a high state of the data line and the data bits are latched on the positive going transitions of the clock pulses.

The differential buffers in FIG. 2 are provided to buffer incoming signals from the remote device, which signals are more susceptible to noise because of the greater distance to the remote control device. The output drivers 28b and 36b for the Remote Control device clock and data lines are normally disabled whenever the receivers 28a and 36a are active. This is to prevent feedback of the received signals via the output drivers. Thus output drivers 28 and 36b are only activated in response to the Driver Enable signal on pin 12 of EPAL 20. The keyboard and the computer clock and data lines are not coupled by differential buffers since they are not prone to noise.

Operation of the arbitration logic will be described with reference to all of the drawings but with particular attention to FIG. 2 and 3. The clock lines connected to the inputs of EPAL 20 are the remote clock line at pin 11, the keyboard clock line at pin 3 and the computer clock line at pin 4. All three clock lines are connected to NAND 90 which toggles when one or more of these input lines is pulled low indicating the presence of a clock signal. (See FIG. 4) NAND 90 toggles in response to the first clock pulse on any of the clock lines and develops a corresponding high logic level signal at its output. The output signal is applied through buffer 97 to produce a high level Clock Active signal at pin 19 of EPAL 20. Referring to FIG. 2, the high level Clock Active signal at pin 19 starts the 60 microsecond timer 40 which produces the Disable signal at pin 1 of EPAL 20 and for timer 38. As mentioned, timer 40 is a retrigerable one-shot and starts to time out. However succeeding clock pulses restart timer 40. Since the clock pulses are 40 microseconds apart, timer 40 doesn't time out until the last clock pulse occurs and therefore maintains the Disable signal. After the 60 microsecond time out period of the timer after the last clock pulse, the Disable signal terminates and 10 microsecond timer 38 generates the Clear signal. The Clear signal is maintained for 10 microseconds, i.e. until timer 38 times out.

Referring back to FIG. 3, the Disable signal on pin 1 is applied to the clock input terminals of the three flip flop latches 68, 74 and 80. When the flip flops are clocked, the information on their D input terminals is transferred to their Q output terminals. The information on the D input terminals of these flip flops are the remote control device clock signal, the keyboard clock signal and the computer clock signal (as inverted by inverter 60, 61 and 64), respectively. Thus the status of each individual clock line is latched by operation of the flip flops. As mentioned, a priority arrangement is provided in the arbitration logic to resolve situations where simultaneous clock signals are detected. While the particular priority arrangement will be described, it should not be considered controlling insofar as the invention is concerned.

In the hierarchical order of commands in the preferred embodiment, the computer takes precedence, the keyboard is next and the remote control device has the lowest priority. The priority is established by Inverters 84 and 85 and the interconnections of the flip flops and the AND gates. If flip flop 80 latches a high level signal at its Q output, it blocks both the keyboard and remote device clock and data lines. Therefore, in the face of a computer clock line signal and one or more simultaneous keyboard and remote clock line signals, the computer will prevail. When a computer clock signal is detected, NAND 90 toggles to produce a Clock Active signal on pin 19 and flip flop 80 latches that status. By virtue of inverter 85, the Q output terminal signal on flip flop 80 also disables ANDs 86, 87, 88 and 89, which in turn disable ORs 93 and 94 and precludes the K/R Data and Clock Active signals being developed. This prevents signals from the remote control device 12 or keyboard 11 from interfering with signals provided by the computer on the data and clock lines. The Q output terminal of flip flop latch 80 also enables ANDs 91 and 92 which permits the computer clock and data signals to be transmitted therethrough via inverters 64 and 65 and buffers 98 and 99, respectively, to alternately toggle the logic voltage leads on terminals 18 and 16 to provide the information from the computer. By virtue of output enabler buffer 82, the Q output terminal signal of flip flop latch 80 is also applied to pin 12 of the EPAL 20. Thus the Drive enable signal enables output drivers 28b and 36b of the remote control device clock and data lines respectively. Thus communication may transpire between the computer and the remote control device 12 and keyboard 11.

If simultaneous keyboard and remote control device clock line signals are received, the keyboard will prevail. This is because flip flop latch 74 locks the status of the keyboard clock line and enables ANDS 87 and 89 for passing the keyboard clock and data signals to pins 17 and 15 respectively. At the same time inverter 84 disables ANDS 86 and 88 and disables the remote control unit clock and data lines. Since output drivers 28b and 36b for supplying information to remote control unit are not energized (pin 12 of EPAL 20 is not energized) the keyboard information is not supplied to the remote control unit.

Assuming that the remote control device clock line is activated, flip flop latch 68 locks that status on its Q output terminal when the Clock Active signal is produced. ANDs 86 and 88 are enabled. The data is passed via inverter 62, AND 88, OR 94, and output buffer 96 to pin 15 where it is supplied through inverter 43 to the computer data line. Clock signals are passed via inverter 60, AND 86, OR 93, and output buffer 95 to pin 17 where they are supplied through inverter 45 to the computer clock line.

What has been described is a novel arbitration system in which an external keyboard and a remote control device may be intercoupled to the keyboard slot of a computer and communications carried out among them without confusion. It is recognized that numerous changes in the described embodiment of the invention will be apparent to those skilled in the art without departing from its true spirit and scope.

What is claimed is:

1. A communications system including arbitration means for regulating communications between a keyboard and a remote control unit and a computer via a keyboard input to the computer and wherein each of said computer, said keyboard and said remote control unit include individual clock lines and individual data lines and each of said computer, keyboard and remote control unit includes clock signal generating means for placing a pulsed clock signal on its associated clock line when supplying a pulsed data signal on its associated data line, comprising:
   an arbitration logic network interconnected with said clock lines and said data lines;
   a plurality of flip flop latches in said logic network coupled to respective ones of said clock lines;
   logic means for developing a clock active signal in response to the presence of one or more clock signals on said clock lines; and
   retriggerable timer means responsive to said clock active signal for coupling a disable signal to said flip flop latches for latching the status of said clock lines;
   said timer means being retriggered by successive pulses of said clock active signal and maintaining said disable signal for a predetermined timeout period after said termination of clock active signal.

2. The system of claim 1 further including inhibit means in said logic network for establishing priority of computer clock signals over simultaneously applied keyboard and remote control unit clock signals.

3. The system of claim 2 further including additional inhibit means in said logic network establishing priority of keyboard clock signals over simultaneously applied remote control unit clock signals.

4. The system of claim 1 wherein said clock active signal corresponds to said clock signal and wherein said timeout period is greater than the period between said pulses of said clock signal.

5. The system of claim 4, including additional timer means, energized responsive to said timer means completing said timeout period, for developing a clear signal for clearing said flip flop latches.

* * * * *